US010948064B2

(12) United States Patent
Öberg et al.

(10) Patent No.: US 10,948,064 B2
(45) Date of Patent: Mar. 16, 2021

(54) METHOD FOR CONTROLLING A DIFFERENTIAL BRAKING ARRANGEMENT

(71) Applicant: VOLVO TRUCK CORPORATION, Gothenburg (SE)

(72) Inventors: Niklas Öberg, Torslanda (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/615,282

(22) PCT Filed: Jun. 9, 2017

(86) PCT No.: PCT/EP2017/064164
§ 371 (c)(1),
(2) Date: Nov. 20, 2019

(87) PCT Pub. No.: WO2018/224171
PCT Pub. Date: Dec. 13, 2018

(65) Prior Publication Data
US 2020/0164875 A1 May 28, 2020

(51) Int. Cl.
*B60W 10/16* (2012.01)
*F16H 48/22* (2006.01)
(Continued)

(52) U.S. Cl.
CPC ............ *F16H 48/22* (2013.01); *B60K 23/04* (2013.01); *B60T 8/172* (2013.01); *B60T 8/18* (2013.01);
(Continued)

(58) Field of Classification Search
None
See application file for complete search history.

(56) References Cited

U.S. PATENT DOCUMENTS 6,076,898 A * 6/2000 Ota ..................... B60T 7/122
303/139
6,085,138 A 7/2000 Smith et al.
(Continued)

FOREIGN PATENT DOCUMENTS

DE 19817212 A1 10/1998
WO 2008140360 A1 11/2008

OTHER PUBLICATIONS

International Search Report and Written Opinion in corresponding International Application No. PCT/EP2017/064164 dated Feb. 13, 2018 (12 pages).

*Primary Examiner* — Dirk Wright
(74) *Attorney, Agent, or Firm* — Venable LLP; Jeffri A. Kaminski (57) ABSTRACT

A method for controlling a differential braking arrangement of a vehicle, said vehicle comprising at least one auxiliary braking arrangement and at least one differential braking arrangement, said auxiliary braking arrangement and said differential braking arrangement being connected to a pair of propelled wheels of said vehicle, wherein the differential braking arrangement is arranged to control a relative rotational speed between the pair of propelled wheels, wherein the method comprises the steps of receiving a signal indicative of a downhill slope for a road ahead of said vehicle; determining an inclination of said downhill slope; determining a braking power needed for the at least one auxiliary braking arrangement for preventing the vehicle speed of the vehicle from exceeding a predetermined speed limit when driving at the downhill slope; and engaging the at least one differential braking arrangement for reducing the relative rotational speed between the propelled wheels if the determined braking power of the at least one auxiliary braking arrangement is higher than a predetermined threshold.

14 Claims, 4 Drawing Sheets

(51) Int. Cl.
  *B60K 23/04* (2006.01)
  *B60T 8/172* (2006.01)
  *B60T 8/18* (2006.01)
  *B60T 8/24* (2006.01)
  *B60T 8/58* (2006.01)
  *B60W 10/18* (2012.01)
  *B60W 30/18* (2012.01)
  *F16H 48/24* (2006.01)
  *B60K 17/36* (2006.01)

(52) U.S. Cl.
  CPC ............... *B60T 8/245* (2013.01); *B60T 8/58* (2013.01); *B60W 10/16* (2013.01); *B60W 10/18* (2013.01); *B60W 30/18109* (2013.01); *F16H 48/24* (2013.01); *B60K 17/36* (2013.01); *B60K 2023/046* (2013.01); *B60T 2201/04* (2013.01); *B60T 2201/14* (2013.01); *B60T 2210/14* (2013.01); *B60T 2210/20* (2013.01); *B60T 2210/32* (2013.01); *B60T 2250/02* (2013.01); *B60T 2250/04* (2013.01); *B60T 2260/09* (2013.01); *B60W 2520/10* (2013.01); *B60W 2530/10* (2013.01); *B60W 2552/15* (2020.02); *B60W 2710/125* (2013.01); *B60W 2710/18* (2013.01); *B60W 2720/10* (2013.01)

(56) References Cited

U.S. PATENT DOCUMENTS

| | | | | |
|---|---|---|---|---|
| 7,134,985 | B2* | 11/2006 | Watanabe | B60T 8/245 |
| | | | | 477/186 |
| 8,401,753 | B2* | 3/2013 | Chappell | B60W 30/18009 |
| | | | | 701/65 |
| 8,467,943 | B2* | 6/2013 | Dersjo | E02F 9/2045 |
| | | | | 701/50 |
| 8,589,045 | B2* | 11/2013 | Seymour | B60T 7/22 |
| | | | | 701/70 |
| 2002/0033292 | A1 | 3/2002 | Uematsu et al. | |
| 2005/0096183 | A1 | 5/2005 | Watanabe et al. | |
| 2012/0205182 | A1 | 8/2012 | Rindfleisch | |

* cited by examiner

METHOD FOR CONTROLLING A DIFFERENTIAL BRAKING ARRANGEMENT

CROSS-REFERENCE TO RELATED APPLICATIONS

This application is a U.S. National Stage application of PCT/EP2017/064164, filed Jun. 9, 2017 and published on Dec. 13, 2018 as WO/2018/224171, all of which is hereby incorporated by reference in its entirety.

TECHNICAL FIELD

The invention relates to a method for controlling a differential braking arrangement of a vehicle. The invention also relates to a system for controlling a differential braking arrangement, and a vehicle comprising such a system. The invention is preferably applicable on heavy duty vehicles commonly referred to as trucks. However, the invention may also be applicable for any other vehicle comprising auxiliary braking arrangements and differential braking arrangements.

BACKGROUND

In connection to low-, medium and heavy duty vehicles, also commonly referred to as trucks, there is always a high demand on the vehicle brakes. These demands relate in particular to the braking capability for the vehicle as the vehicle brakes need to function properly in order to sufficiently reduce the vehicle speed.

For example, when driving at a relatively steep downhill slope, where braking is necessary to prevent the vehicle from exceeding a predetermined allowable speed limit, there is of particular relevance that the vehicle brakes function properly. In such situation, an auxiliary braking arrangement of the vehicle is often utilized for reducing, or maintaining the vehicle speed. Hereby, a reduction of wheel brake wear is achieved since the wheel brakes, i.e. the service brakes, does not have to be fully utilized. It is thus important to control the auxiliary braking arrangement properly for sufficiently controlling the speed of the vehicle when driving the downhill slope.

However, when engaging the auxiliary braking arrangement, there is a risk that one of the wheels will slip relative the other wheels. Accordingly, there is a desire to improve the control of the vehicle during an event when engaging the auxiliary braking arrangement.

SUMMARY

It is an object of the present invention to provide a method for controlling a differential braking arrangement which at least partially overcomes the above described deficiencies. This is achieved by a method according to claim 1.

According to a first aspect of the present invention, there is provided a method for controlling a differential braking arrangement of a vehicle, the vehicle comprising at least one auxiliary braking arrangement and at least one differential braking arrangement, the auxiliary braking arrangement and the differential braking arrangement being connected to a pair of propelled wheels of the vehicle, wherein the differential braking arrangement is arranged to control a relative rotational speed between the pair of propelled wheels, wherein the method comprises the steps of receiving a signal indicative of a downhill slope for a road ahead of the vehicle; determining an inclination of the downhill slope; determining a braking power needed for the at least one auxiliary braking arrangement for preventing the vehicle speed of the vehicle from exceeding a predetermined speed limit when driving at the downhill slope; and engaging the at least one differential braking arrangement for reducing the relative rotational speed between the propelled wheels if the determined braking power of the at least one auxiliary braking arrangement is higher than a predetermined threshold limit, wherein the at least one differential braking arrangement is engaged when the vehicle is positioned at a predetermined distance from the downhill slope.

The wording "auxiliary braking arrangement" may relate to various braking arrangements that are not the ordinary service brake, i.e. not the wheel brake, nor the parking brake. The auxiliary braking arrangement operates on the propelled wheels of the vehicle. The auxiliary braking arrangement may, for example be a gear box retarder arrangement positioned in the gear box of the vehicle. Such gear box retarder arrangement may preferably be arranged at the rear end of the gearbox and connected to the output shaft thereof. Another example of an auxiliary braking arrangement may be an exhaust brake. The exhaust brake is operated by closing off the exhaust path from the engine. This will in turn cause the vehicle to slow down. Other alternative auxiliary braking arrangements are also conceivable.

A differential braking arrangement on the other hand should be construed as a brake which is arranged to reduce the relative speed difference between wheels, or shafts. As will be described below, the differential braking arrangement may be designed as a dog clutch or as a friction brake.

An advantage of the present invention is that by engaging the at least one differential braking arrangement before the vehicle arrives at the downhill slope, the at least one differential braking arrangement will not be exposed to high torque loads. The inventors of the present disclosure have realized that the differential braking arrangement can be engaged before arriving at the downhill slope where the at least one auxiliary braking arrangement will be engaged. As stated above, the differential braking arrangement will not be exposed to high torque loads as would be the case if the differential braking arrangement is engaged when the at least one auxiliary braking arrangement is already positioned in the engaged state for reducing the speed of the vehicle.

By engaging the differential braking arrangement, the rotational speed of the wheels on the left hand side and the right hand side of the vehicle will be substantially the same which will reduce the risk of wheel slip when driving downhill and at the same time reducing, or maintaining the vehicle speed by means of the at least one auxiliary braking arrangement.

Furthermore, as stated above, the at least one differential braking arrangement is engaged when the vehicle is positioned at a predetermined distance from the downhill slope. This predetermined distance may be of different length depending on the specific vehicle used. Hence, the predetermined distance may be a vehicle specific distance, or specific for various applications. Accordingly, the predetermined distance may be dependent on the road at which the vehicle is driven or the downhill slope ahead of the vehicle. The predetermined distance may also relate to the position on the crest of the downhill slope, just before the vehicle enters the downhill slope. The predetermined distance may thus also relate to a small distance before the slope exceeds a predetermined threshold value, wherein the predetermined threshold value defines an angle of the slope at which the at least one differential braking arrangement will be exposed to torque loads.

According to an example embodiment, the method may further comprise the steps of engaging the at least one auxiliary braking arrangement when the vehicle is driven at the downhill slope after the differential braking arrangement is engaged. Hereby, the differential braking arrangement is engaged and the vehicle may thus reduce the speed, or keep the speed at a desired vehicle speed.

According to an example embodiment, the method may further comprise the steps of disengaging the at least one auxiliary braking arrangement after the vehicle has driven at the downhill slope; and subsequently disengaging the at least one differential braking arrangement. Thus, the differential braking arrangement is kept engaged for the full time period when the auxiliary braking arrangement is engaged. Hereby, the differential braking arrangement will be disengaged when not being exposed to torque loads.

According to an example embodiment, the step of engaging the at least one differential braking arrangement may be preceded by the steps of determining that the at least one auxiliary braking arrangement is engaged and the vehicle is driven at a road having an inclination lower than a predetermined angular threshold limit; and disengaging the at least one auxiliary braking arrangement before the vehicle is positioned at the predetermined distance from the downhill slope. Hereby, the auxiliary braking arrangement can be disengaged for a short time period, at which time period the differential braking arrangement can be engaged, where after the auxiliary braking arrangement is engaged.

According to an example embodiment, the method may further comprise the steps of determining a weight of the vehicle; determining a current vehicle speed; and determining the braking power based on the determined weight of the vehicle and the current vehicle speed. The weight of the vehicle may preferably relate to the total weight of the vehicle.

According to an example embodiment, the predetermined threshold limit for the braking power may be based on at least one of a vehicle weight, current vehicle speed and inclination of the downhill slope. Hence, the predetermined threshold limit may be an adaptive threshold limit which changes depending on the specific situation and circumstances for the vehicle. Hereby, the differential braking arrangement is engaged only when necessary which will further reduce wear thereof.

According to an example embodiment, the predetermined threshold limit for the braking power may be based on at least one of an ambient temperature outside the vehicle and a road surface characteristic of the downhill slope.

According to an example embodiment, the at least one differential braking arrangement may comprise a dog clutch, wherein the relative rotational speed between the propelled wheels is substantially zero when engaging the differential braking arrangement.

The wording "substantially zero" should in this context be understood such as to admit rattle in the dog clutch. The dog clutch may be exposed to such rattle when, for example, being exposed to low torque loads, or alternating torque loads.

According to an example embodiment, the at least one differential braking arrangement may comprise a friction clutch, the at least one differential braking arrangement being engageable in a fully engaged position or a partly engaged position. A friction clutch may thus allow for a small relative difference in rotational speed between the wheels on the left hand side and the right hand side of the vehicle.

According to an example embodiment, the step of determining the inclination of the downhill slope may be determined based on a signal received from logged road data or a navigation system. The logged data may be provided to a control unit of the vehicle from situations where the road has been driven at an earlier point in time. The logged road data may be provided to the control unit from the specific vehicle driving at the road, or provided via a suitable communication arrangement to the control unit of the vehicle.

According to a second aspect, there is provided a system for controlling a differential braking arrangement of a vehicle, the system being connectable to a vehicle comprising at least one auxiliary braking arrangement and at least one differential braking arrangement, the auxiliary braking arrangement and the differential braking arrangement being connected to a pair of propelled wheels of the vehicle, wherein the differential braking arrangement is arranged to control a relative rotational speed between the pair of propelled wheels, wherein the system comprises a control unit configured to receive a signal indicative of a downhill slope for a road ahead of the vehicle; determine an inclination of the downhill slope; determine a braking power needed for the at least one auxiliary braking arrangement for preventing the vehicle speed of the vehicle to exceed a predetermined speed limit when driving at the downhill slope; and control the at least one differential braking arrangement to be engaged for reducing the relative rotational speed between the propelled wheels if the determined braking power of the at least one auxiliary braking arrangement is higher than a predetermined threshold limit, wherein the control unit controls at least one differential braking arrangement to be engaged when the vehicle is positioned at a predetermined distance from the downhill slope.

The control unit is thus arranged to control a variety of vehicle functionalities. The control unit may be specifically arranged to control the above described system or may be a control unit which also controls other functionalities of the vehicle. The control unit may further be arranged to receive a signal indicative of a distance to the downhill slope.

Effects and features of the second aspect are largely analogous to those described above in relation to the first aspect.

According to a third aspect, there is provided a vehicle comprising at least one pair of propelled wheels, at least one auxiliary braking arrangement and at least one differential braking arrangement connected to the pair of propelled wheels, wherein the differential braking arrangement is arranged to control a relative rotational speed between the pair of propelled wheels, wherein the vehicle further comprises a system as described above in relation to the second aspect.

According to a fourth aspect, there is provided a computer program comprising program code means for performing any of the steps described above in relation to the first aspect when the program is run on a computer.

According to a fifth aspect, there is provided a computer readable medium carrying a computer program comprising program means for performing any of the steps described above in relation to the first aspect when the program means is run on a computer.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
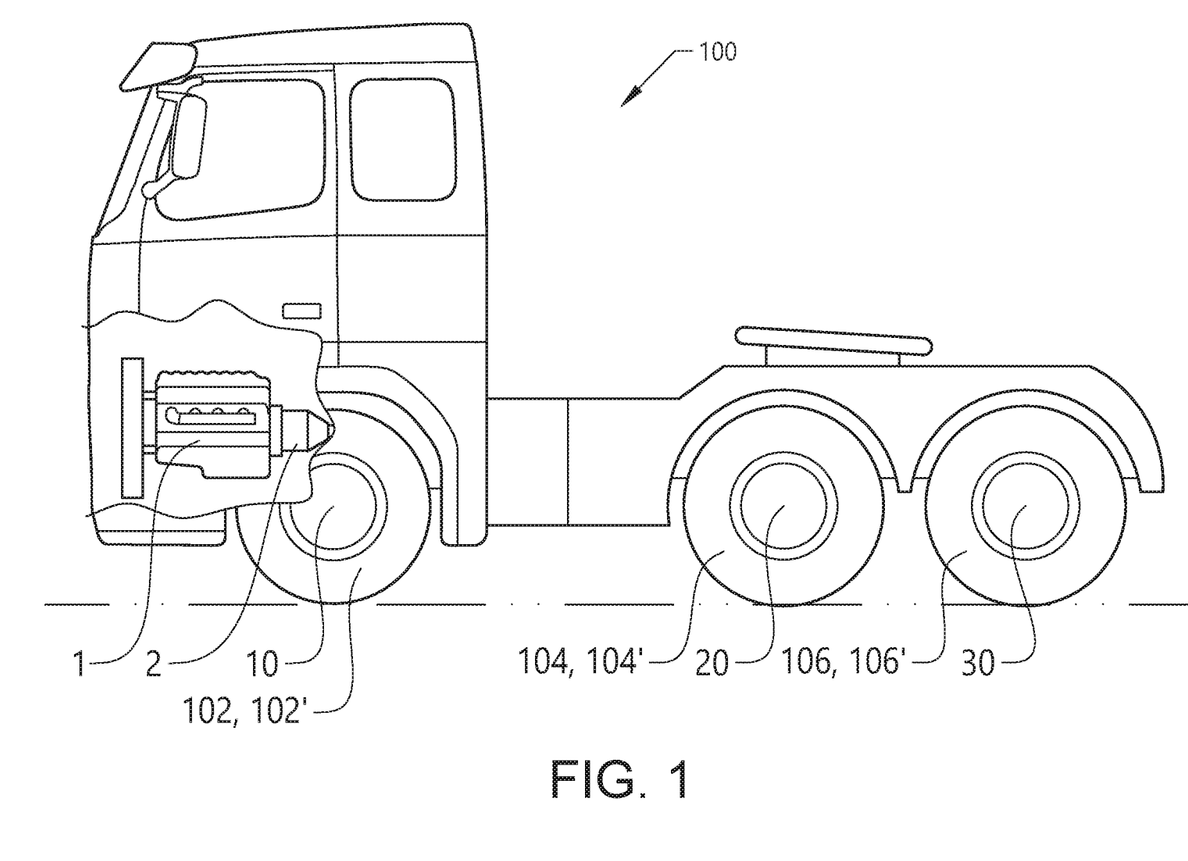
FIG. 1 is a lateral side view illustrating an example embodiment of a vehicle in the form of a truck.

With particular reference to FIG. 1, there is provided a vehicle 100 in the form of a truck for which the method of the present disclosure can be applicable. As can be seen, the vehicle 100 comprises a prime mover 1, here in the form of an internal combustion engine, and a gear box 2 connected downstream the prime mover 1. The vehicle 100 also comprises a front wheel axle 10 comprising a pair of front, steerable wheels 102, 102'. The front wheel axle 10 may be either a non-propelled wheel axle or a propelled wheel axle. The vehicle 100 further comprises a first rear wheel axle 20 and a second rear wheel axle 30, where the first rear wheel axle 20 is positioned in front of the second rear wheel axle 30 as seen in the longitudinal forward driving direction of the vehicle 100. The first 20 and second 30 rear wheel axles may be propelled wheel axles as will be described further below. Also, the first rear wheel axle 20 comprises a pair of first rear wheels 104, 104' and the second rear wheel axle 30 comprises a pair of second rear wheels 106, 106'. The pair of wheels thus comprises one wheel 104, 106 arranged on the left hand side of the vehicle 100 and one wheel 104', 106' arranged on the right hand side of the vehicle 100 as seen in the longitudinal forward driving direction of the vehicle 100.

Figure 2:
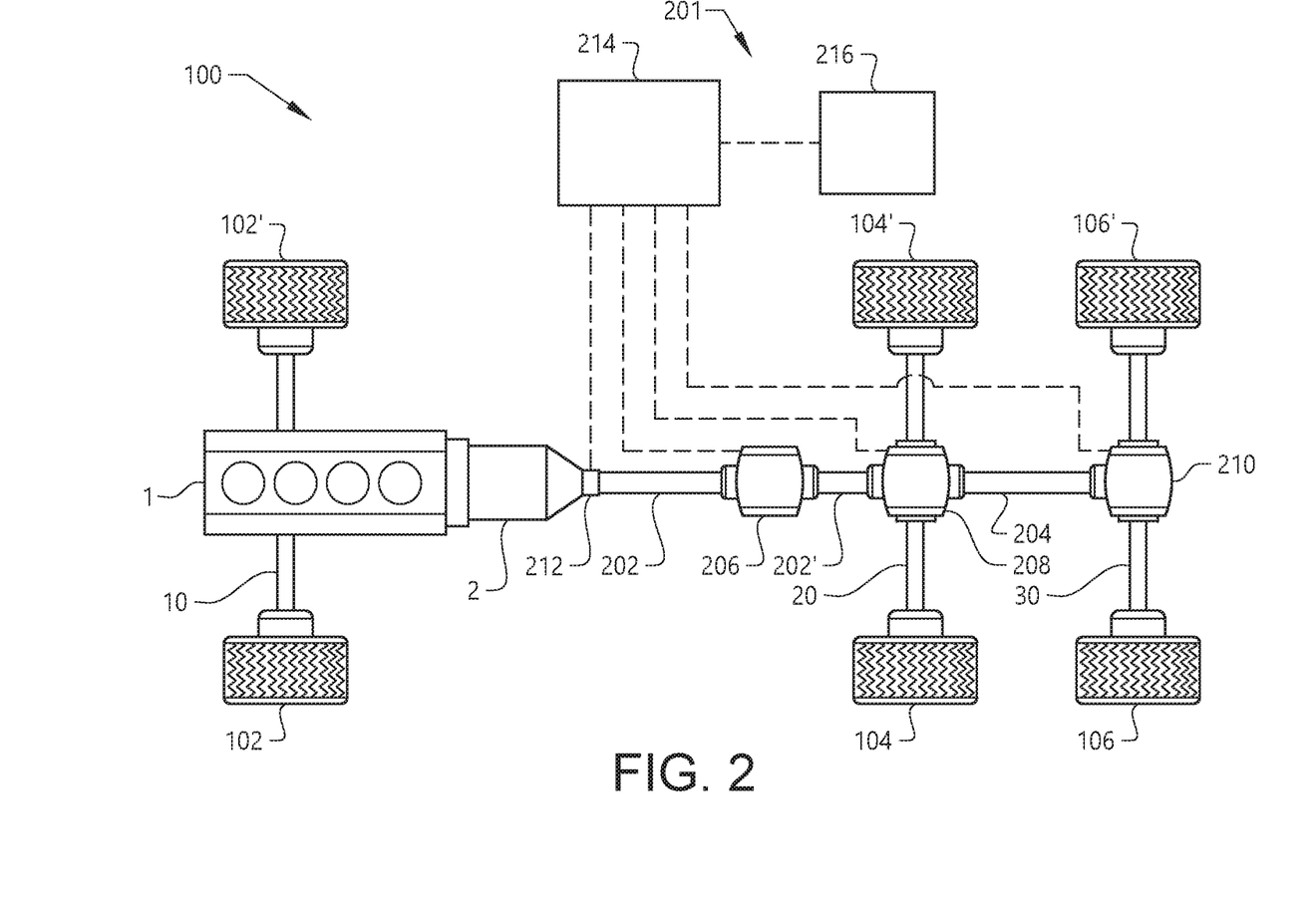
FIG. 2 is a schematic illustration of an example embodiment of the driveline of the vehicle in FIG. 1.

Reference is made to FIG. 2, which illustrate the driveline of the vehicle, or more specifically the prime mover 1, the gear box 2 and the connection to the first 20 and second 30 rear wheel axles. In the example embodiment depicted in FIG. 2, the first 20 and second 30 rear wheel axles are hence propelled wheel axles connected to the prime mover 1 and gear box 2 via a front propeller shaft 202, 202' and a rear propeller shaft 204. The front propeller shaft 202, 202' is arranged between the gear box 2 and the first rear wheel axle 20, and the rear propeller shaft 204 is arranged between the first rear wheel axle 20 and the second rear wheel axle 30. The front propeller shaft is further split into a first 202 and a second 202' front propeller shaft by means of a longitudinal differential braking arrangement 206. The longitudinal differential braking arrangement 206 is thus arranged to control a relative rotational speed between the first and second front propeller shafts 202, 202'.

Furthermore, the vehicle 100 comprises a first differential braking arrangement 208 arranged to control a mutual rotation between the pair of first rear wheels 104, 104'. Hence, when the first differential braking arrangement 208 is engaged, the relative rotational speed between the right 104' and left 104 first rear wheels is substantially zero. The first differential braking arrangement 208 may also be arranged to slip for allowing a mutual rotation between the right 104' and left 104 first rear wheels. The first differential braking arrangement 208 may also be arranged to connect the second front propeller shaft 202' and the rear propeller shaft 204 to each other. Hereby, the first differential braking arrangement 208 is arranged to control whether the second rear wheel axle 30 is propelled or not.

Moreover, the vehicle 100 further comprises a second differential braking arrangement 210 connecting the second rear wheel axle 30 to the rear propeller shaft 204. The second differential braking arrangement 210 is arranged to control a mutual rotation between the pair of second rear wheels 106, 106'. Hence, when the second differential braking arrangement 210 is engaged, the relative rotational speed between the right 106' and left 106 second rear wheels is substantially zero. The second differential braking arrangement 210 may also be arranged to slip for allowing a mutual rotation between the right 106' and left 106 second rear wheels.

The first 208 and second 210 differential braking arrangements may each be arranged as a dog clutch or as a friction clutch.

Still further, the vehicle 100 comprises at least one auxiliary braking arrangement 212. The at least one auxiliary braking arrangement 212 is in FIG. 2 schematically depicted as a gear box retarder connected to the output shaft (not shown) of the gear box 2. The auxiliary braking arrangement 212 is arranged to operate on the propelled wheels of vehicle 100 for reducing the speed of the vehicle 100.

As is further depicted in FIG. 2, the vehicle comprises a system 201 for controlling the at least one differential braking arrangement. The system 201 comprising a control unit 214 connected to each of the at least one auxiliary braking arrangement 212, the longitudinal differential braking arrangement 206, the first differential braking arrangement 208, and the second differential braking arrangement 210. By means of the connection between the control unit 214 and each of the at least one auxiliary braking arrangement 212, the longitudinal differential braking arrangement 206, the first differential braking arrangement 208, and the second differential braking arrangement 210, the control unit 214 is able to e.g. control engagement/disengagement of the auxiliary braking arrangement 212, the longitudinal differential braking arrangement 206, etc.

Still further, the vehicle 100 also comprises means 216 for determining the road ahead of the vehicle 100. The means 216 for determining the road ahead of the vehicle 100 may e.g. be a navigation system or logged road data. By using the means 216 for determining the road ahead of the vehicle 100, the control unit 214 is able to determine that e.g. the vehicle 100 is approaching a downhill slope, the distance to the downhill slope as well as the inclination of the downhill slope.

As not depicted in FIG. 2, the control unit 214 may also be connected to weight indication means of the vehicle and vehicle speed indication means for receiving signals indicative of the weight and speed of the vehicle. Such weight indication means may be one, or several weight sensors of the vehicle.

Figure 3:
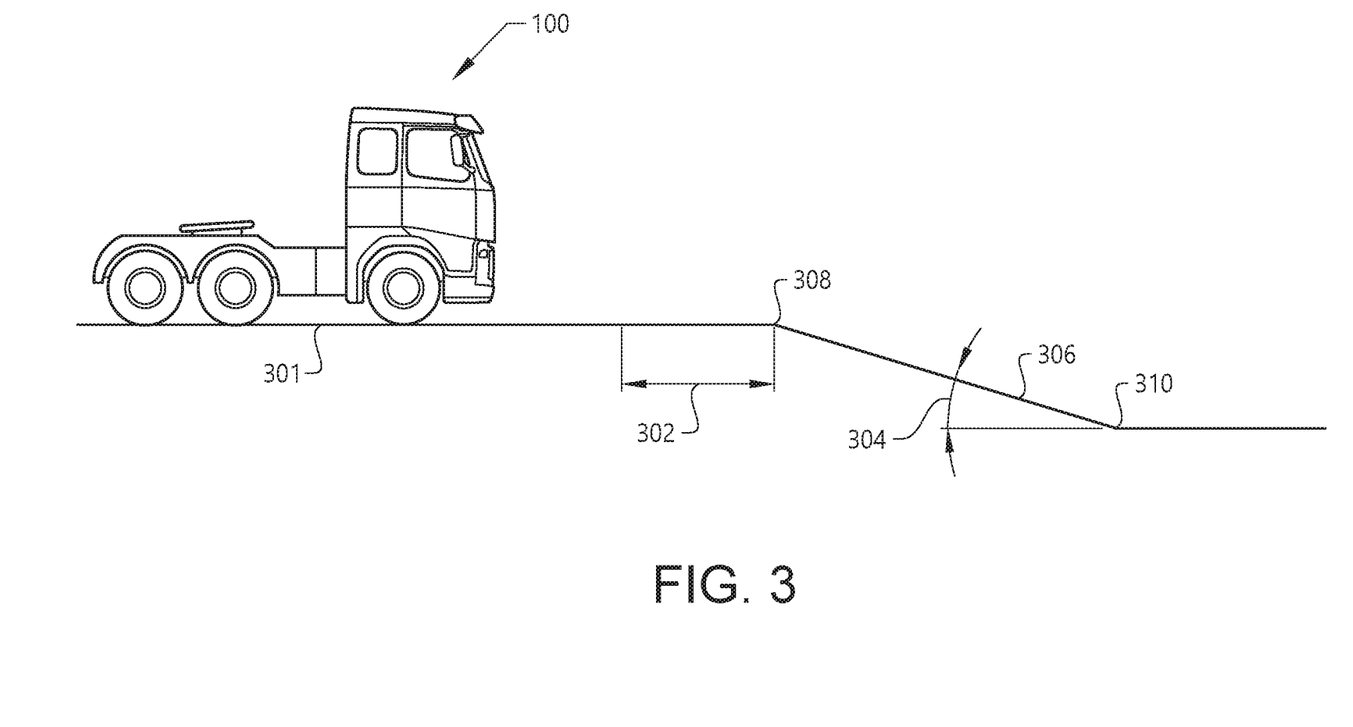
FIG. 3 illustrates the vehicle approaching a downhill slope.
Figure 4:
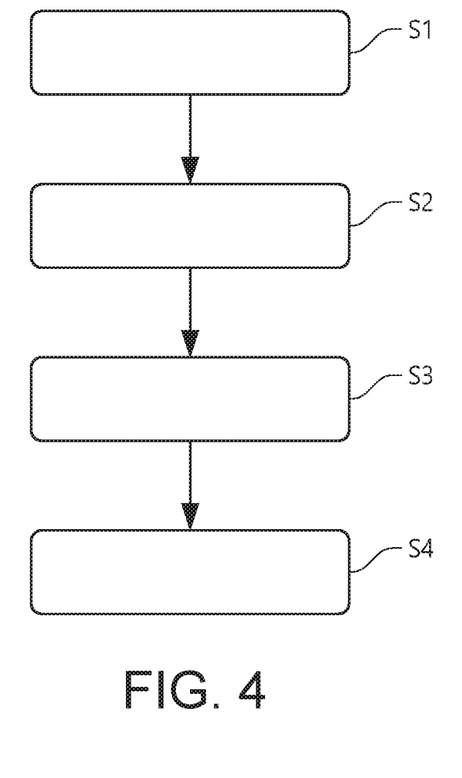
FIG. 4 is flow chart of a method according to an example embodiment.

In order to describe an example embodiment of controlling at least one of the above described differential braking arrangements 206, 208, 210, reference is made to FIGS. 3 and 4.

As depicted in FIG. 3, the vehicle 100 is driven at a relatively flat, non-inclined road surface 301. However, the vehicle 100 is approaching a downhill slope 306. Hereby, the control unit 214 of the vehicle 100 receives S1 a signal indicative of the downhill slope 306. The control unit 214 also determines a distance ahead of the vehicle before the vehicle arrives at the crest 308 of the downhill slope 306. The control unit 214 may determine both the distance to the crest 308 of the downhill slope 306 as well as the time period until the vehicle 100 arrives at the crest 308 of the downhill slope 306.

Furthermore, the control unit 214 also determines S2 an inclination 304 of the downhill slope 306. The inclination 304 may, for example, be a mean value of the inclination which is measured from the crest 308 of the downhill slope to the end 310 of the downhill slope 306. The inclination 304 may also relate to a maximum inclination of the downhill slope 306, which maximum inclination is measured somewhere along the downhill slope 306 between the crest 308 of the downhill slope 306 and the end 310 of the downhill slope 306.

Moreover, based on the determination of the inclination 304 of the downhill slope 306, the control unit 214 determines S3 a braking power of the at least one auxiliary braking arrangement 212 that is required for preventing the vehicle speed from exceeding a predetermined speed limit when driving the downhill slope. The predetermined speed limit may, for example, be the existing speed limit of the road, or a desired speed limit set by e.g. a vehicle cruise control system, etc. If the braking power required by the at least one auxiliary braking arrangement 212 is determined to be higher than a predetermined threshold limit, the control unit 214 thereafter controls the at least one differential braking arrangement 208, 210 to be engaged S4 before the vehicle 100 arrives at the crest 308 of the downhill slope 304. When the at least one differential braking arrangement 208, 210 is engaged, the relative rotational speed between the pair of propelled wheels 104, 104', 106, 106' is reduced.

When the vehicle 100 thereafter is driven at the downhill slope 306, the at least one auxiliary braking arrangement 212 is positioned in the engaged state for preventing the vehicle speed from exceeding the predetermined speed limit. After the vehicle has driven past the end 310 of the downhill slope 306, the at least one auxiliary braking arrangement 212 may be disengaged and subsequently the at least one differential braking arrangement 208, 210 is disengaged.

If the vehicle 100 is driven at a downhill slope and having the at least one auxiliary braking arrangement 212 engaged and the at least one differential braking arrangement 208, 210 is disengaged, the control unit 214 may control the at least one auxiliary braking arrangement 212 to be disengaged for a short duration of time at which the at least one differential braking arrangement 208, 210 can be engaged, where after the at least one auxiliary braking arrangement 212 is re-engaged.

The above described braking power of the at least one auxiliary braking arrangement 212 that is required for preventing the vehicle speed from exceeding a predetermined speed limit can be further based on the weight of the vehicle 100 and/or a current vehicle speed. Thus, an increased braking power may be required if the weight of the vehicle 100 is high. An increased braking power may also be required if the current vehicle speed is substantially higher than the predetermined speed limit, i.e. the vehicle speed must be substantially reduced. Furthermore, the predetermined threshold limit for the braking power of the at least one auxiliary braking arrangement 212 may also be based on the vehicle weight, a current vehicle speed and/or the inclination of the downhill slope. The predetermined threshold limit for the braking power may also be based on an ambient temperature outside the vehicle 100 and/or road surface characteristic of the downhill slope. The control unit 214 is thus arranged to receive signals indicative of the above described parameters for determining the braking power and predetermined threshold limit for the braking power.

It is to be understood that the present invention is not limited to the embodiments described above and illustrated in the drawings; rather, the skilled person will recognize that many changes and modifications may be made within the scope of the appended claims.

The invention claimed is:

1. A method for controlling a differential braking arrangement of a vehicle, the vehicle comprising at least one auxiliary braking arrangement and at least one differential braking arrangement, the auxiliary braking arrangement and the differential braking arrangement being connected to a pair of propelled wheels of the vehicle, wherein the differential braking arrangement is arranged to control a relative rotational speed between the pair of propelled wheels, wherein the method comprises the steps of:
receiving a signal indicative of a downhill slope for a road ahead of the vehicle;
determining an inclination of the downhill slope;
determining a braking power needed for the at least one auxiliary braking arrangement for preventing the vehicle speed of the vehicle from exceeding a predetermined speed limit when driving at the downhill slope; and
engaging the at least one differential braking arrangement for reducing the relative rotational speed between the propelled wheels when the determined braking power of the at least one auxiliary braking arrangement is higher than a predetermined threshold limit, wherein the at least one differential braking arrangement is engaged when the vehicle is positioned at a predetermined distance from the downhill slope.

2. The method according to claim 1, further comprising the step of:
engaging the at least one auxiliary braking arrangement when the vehicle is driven at the downhill slope after the differential braking arrangement is engaged.

3. The method according to claim 2, further comprising the steps of:
disengaging the at least one auxiliary braking arrangement after the vehicle has driven at the downhill slope; and subsequently
disengaging the at least one differential braking arrangement.

4. The method according to claim 1, wherein the step of engaging the at least one differential braking arrangement is preceded by the steps of:
determining that the at least one auxiliary braking arrangement is engaged and the vehicle is driven at a road having an inclination lower than a predetermined angular threshold limit; and
disengaging the at least one auxiliary braking arrangement before the vehicle is positioned at the predetermined distance from the downhill slope.

5. The method according to claim 1, further comprising the steps of:
- determining a weight of the vehicle;
- determining a current vehicle speed; and
- determining the braking power based on the determined weight of the vehicle and the current vehicle speed.

6. The method according to claim 1, wherein the predetermined threshold limit for the braking power is based on at least one of a vehicle weight, current vehicle speed and inclination of the downhill slope.

7. The method according to claim 1, wherein the predetermined threshold limit for the braking power is based on at least one of an ambient temperature outside the vehicle and a road surface characteristic of the downhill slope.

8. The method according to claim 1, wherein the at least one differential braking arrangement comprises a dog clutch, wherein the relative rotational speed between the propelled wheels is substantially zero when engaging the differential braking arrangement.

9. The method according to claim 1, wherein the at least one differential braking arrangement comprises a friction clutch, the at least one differential braking arrangement being engageable in a fully engaged position or a partly engaged position.

10. The method according to claim 1, wherein the step of determining the inclination of the downhill slope is determined based a signal received from logged road data or a navigation system.

11. A system for controlling a differential braking arrangement of a vehicle, the system being connectable to a vehicle comprising at least one auxiliary braking arrangement and at least one differential braking arrangement, the auxiliary braking arrangement and the differential braking arrangement being connected to a pair of propelled wheels of the vehicle, wherein the differential braking arrangement is arranged to control a relative rotational speed between the pair of propelled wheels, wherein the system comprises a control unit configured to:
- receive a signal indicative of a downhill slope for a road ahead of the vehicle;
- determine an inclination of the downhill slope;
- determine a braking power needed for the at least one auxiliary braking arrangement for preventing the vehicle speed of the vehicle to exceed a predetermined speed limit when driving at the downhill slope; and
- control the at least one differential braking arrangement to be engaged for reducing the relative rotational speed between the propelled wheels when the determined braking power of the at least one auxiliary braking arrangement is higher than a predetermined threshold limit, wherein the control unit controls at least one differential braking arrangement to be engaged when the vehicle is positioned at a predetermined distance from the downhill slope.

12. A vehicle comprising at least one pair of propelled wheels, at least one auxiliary braking arrangement and at least one differential braking arrangement connected to the pair of propelled, wherein the differential braking arrangement is arranged to control a relative rotational speed between the pair of propelled wheels, wherein the vehicle further comprises a system according to claim 11.

13. A computer program comprising program code means for performing the steps of claim 1 when the program is run on a computer.

14. A computer readable medium carrying a computer program comprising program means for performing the steps of claim 1 when the program means is run on a computer.

* * * * *